US006045659A

United States Patent [19]

Bjoerkhaug et al.

[11] Patent Number: 6,045,659

[45] Date of Patent: Apr. 4, 2000

[54] DEVICE FOR RECOVERY OF EXCESS GAS IN AN OIL/GAS TREATMENT PLANT

[75] Inventors: Magne Bjoerkhaug, Mathopen; Thormod Hope, Godvik; Jacob Lillesund, Reyksund, all of Norway

[73] Assignee: Den norske stats oijeselkap a.s., Stavanger, Norway

[21] Appl. No.: 08/535,068

[22] PCT Filed: Feb. 8, 1996

[86] PCT No.: PCT/NO94/00081

§ 371 Date: Jan. 4, 1996

§ 102(e) Date: Jan. 4, 1996

[87] PCT Pub. No.: WO94/25541

PCT Pub. Date: Nov. 10, 1994

[30] Foreign Application Priority Data

May 3, 1993 [NO] Norway .................................... 931596

[51] Int. Cl.[7] ...................................................... C01G 70/00

[52] U.S. Cl. .......................... 196/132; 196/136; 196/137

[58] Field of Search .................................... 196/132, 136, 196/137

[56] References Cited

U.S. PATENT DOCUMENTS

| | | | |
|---|---|---|---|
| 2,791,545 | 5/1957 | Kilpatrick | 196/132 |
| 2,943,998 | 7/1960 | Decker | 196/136 |
| 2,974,100 | 3/1961 | Mitchell | 196/132 |
| 3,207,675 | 9/1965 | Gladieux | 106/137 |
| 3,733,838 | 5/1973 | Delahunty | 62/54 |
| 3,877,240 | 4/1975 | Kniel et al. | 62/50 |
| 3,903,708 | 9/1975 | Mair | 62/54 |

FOREIGN PATENT DOCUMENTS

| | | |
|---|---|---|
| 0 164 566 | 12/1985 | European Pat. Off. . |
| 266 006 | 3/1989 | Germany . |
| 2 066 936 | 7/1981 | United Kingdom . |

*Primary Examiner*—Christopher Upton
*Attorney, Agent, or Firm*—Foley & Lardner

[57] ABSTRACT

The invention relates to the recovery of excess gas which is formed in an oil/gas treatment plant, more specifically in a production plant where gas-containing oil in a separation plant is separated into a gas fraction and an oil fraction which are individually advanced for respective applications. The excess gas is advanced for recovery through a special collection conduit (40) on which there is coupled a branch conduit (72) which leads to a torch (74), and which comprises valves (76, 78) which are primarily closed, but which secondarily are adapted to open for the flow of gas to a torch (74) when the pressure of the excess gas exceeds a given value and/or when an irregular emergency situation occurs in the plant. There is also mentioned a concrete solution for joining of the excess gas with the extracted process gas.

8 Claims, 3 Drawing Sheets

DEVICE FOR RECOVERY OF EXCESS GAS IN AN OIL/GAS TREATMENT PLANT

BACKGROUND OF THE INVENTION

The present invention relates to a device in an oil/gas treatment plant where excess gas from a number of sources is intercepted and is led through a collection conduit for advancing for recovery.

By oil/gas treatment plant is meant plant for oil production where hydrocarbon gases are separated from the Oil, refining plant, plus all types of processing plants from which combustible gases are formed which must be handled in a separate plant.

1. Field of the Invention

The invention has particular application in connection with oil production plants where the gaseous hydrocarbons are separated from the oil. Such plants comprise separate collection conduits for the leading away of excess gases to a flame tower where the gases are either released directly out into the atmosphere (cold torch) or burned off. The collection conduit systems are connected via conduits having valves to their respective separators and compressors in the plant. When an abnormal situation, such as too high a gas pressure, leakages, conduit breakage and the like, arises in one of these conduit systems or apparatuses, associated measuring instruments will register this and open associated valves so that the excess gases are led into the collection conduit system. However it often happens that such valves are not closed satisfactorily after they have been in operation, and therefore they continue to leak gases into the collection conduit system. Repairs of such valve leakages however must as a rule be postponed until the usual periodic examination of the plant.

When the excess gas is burned off the collection conduit must as a rule be supplied with a combustible gas in order to obtain a uniform gas supply for maintaining a flame in the flame tower, while when the gas is to be released unburned out into the atmosphere an inert gas is often supplied. In a normal operating situation the combustible gas feeds constitute, together with the said valve leakage gases (that is to say processing gases) the main sources for that excess gas which is burned off in the flame tower. There is consequently a continuous need for diverting and possibly burning off excess gases in a flame. Measurements have shown that the volume of gas which is released or burned off per twenty four hours can constitute up to 36000 $m^3$ per plant.

In society there is increasing interest in the condition of the environment, and one is particularly aware of the escape of air gases, such as $CO_2$, which can produce the so-called greenhouse effect. In this connection it is desirable to reduce the extent of the escape of torch gases. Furthermore it is clear that the excess gases represent a significant resource and that a better utilisation of the excess gases, in addition to the environmental, will also yield a contribution positive to the economy of the plant.

2. Description of Related Art

There are processes described hitherto for the recovery of excess gases in the treatment of oil products, which include a plant where excess gases are burned off in a flame tower.

In GB-Patent Application 2.066.936 a refining plant for oil is disclosed where excess gases in the form of hydrocarbon fractions are to be recovered. These excess gases are diverted from a torch conduit system and are condensed in one or more steps by compression and cooling down whereby the condensate is led back to the process. The gas residue however is led out into a torch tower and burned off. Thus according to the known solution the intention is that the residue amounts of hydrocarbon gases shall still be led continuously to the flame tower, or alternatively these residue gases shall be used as a fuel gas.

In DD-Patent Specification 266.006 a plant is disclosed for conducting together from several sources combustible gases having very dissimilar compositions into two main streams. The joint conduction is controlled by means of computers which regulate the mixture based on measurements of the calorific value of the gases. In this case there is also included a torch system.

SUMMARY OF THE INVENTION

None of the afore-mentioned patent specifications deal with a separation plant of the type, which is discussed in the present invention, where gas is to be separated from oil, and where burning off or diverting of excess gases via a flame tower is reduced to apply in the extreme only to the few cases where typical emergency situations are in question.

Against this background it is an object of the present invention to produce a device for the recovery of the afore-mentioned excess gases, whereby the need for burning off by torch is strongly reduced. Thus the aim is a novel device for conducting the excess gas back to the gas fraction which is formed in the main process.

Furthermore it is an object of the invention to produce a device, including a safety arrangement which can handle with a high degree of reliability possible malfunctions which occur in the plant during normal recovery of excess gas.

The device according to the present invention is characterized in that the collection conduit downstream of the sources comprises a branching point having a branch conduit in which safety arrangements including a torch are coupled, which safety arrangements primarily close off the branch conduit, but secondarily open the branch conduit or diverting the excess gas to the torch, when the pressure of the excess gas exceeds a given value and/or when a malfunction occurs in the plant.

The specific constructions of the present invention are evident from the dependent claims.

According to one of these specific constructions of the device according to the invention the branching conduit which advances the excess gas, is connected to a connection conduit which connects the separator in the separation plant operating at the lowest pressure to a first compressor in the compressor plant, for recovering the excess gas on conduction together with the gas volume from the separation plant.

BRIEF DESCRIPTION OF THE DRAWINGS

For a more detailed study of the invention the accompanying drawings shall be referred to in the following description, in which.

DESCRIPTION OF THE PREFERRED EMBODIMENTS

The invention shall be explained further in detail in connection with an oil production plant. In such a plant hydrocarbon gases are separated in a known manner stepwise from a high pressure oil in a number of separators, while the separated gases are thereafter placed under pressure in a number of compressors. Furthermore the excess gases are collected in one or more separate collection conduits. The number of separators can vary and the number of compressors will depend upon the number of separators, the pressure in these and the demand for the pressure from the last compressor.

Figure 1:
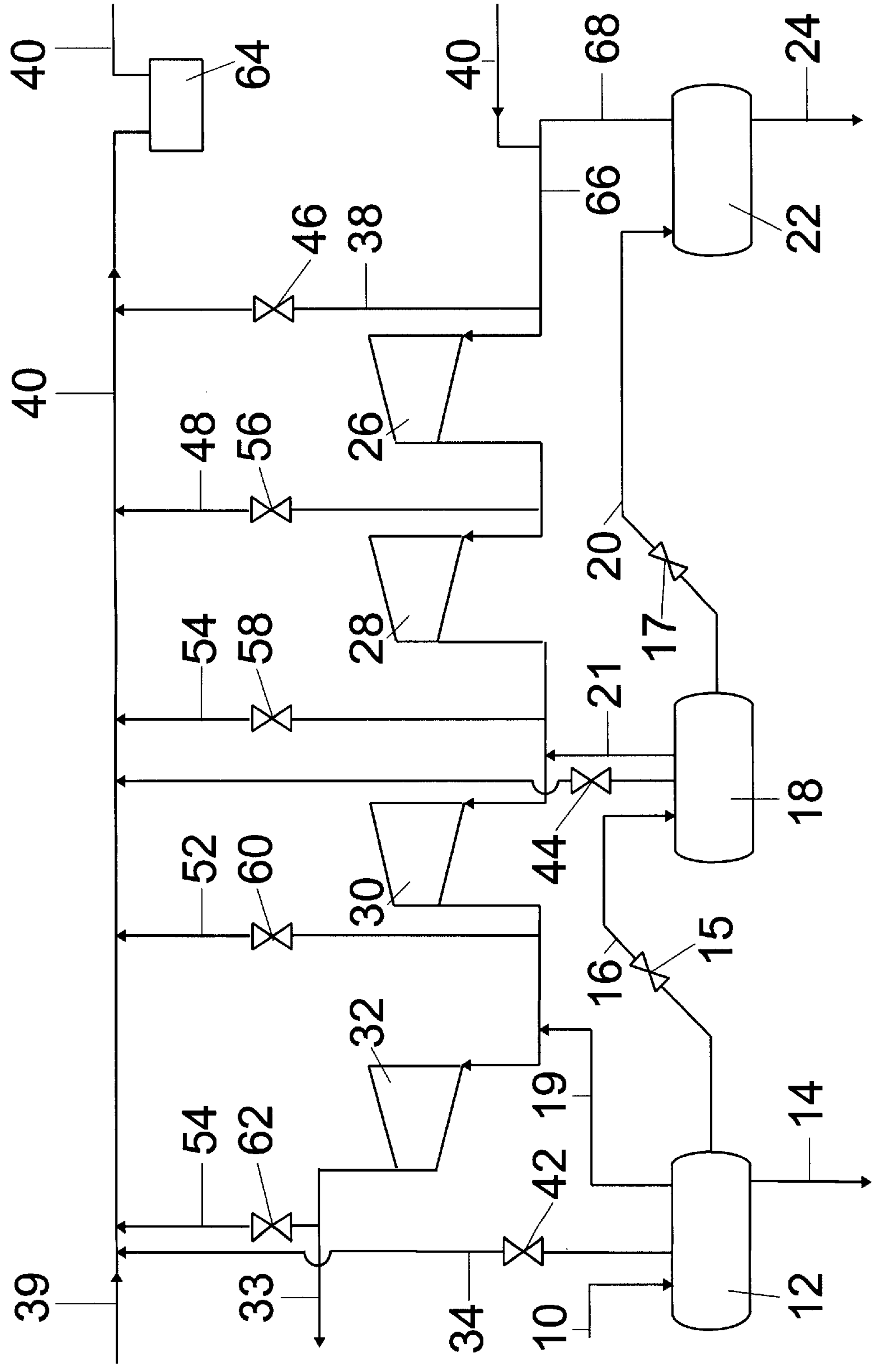
FIG. 1 shows a simplified flow sheet of the principle in an oil separation plant for advancing gases from separator to compressor, plus an arrangement of a collection conduit for excess gases.

As an example a plant which comprises three separators and four compressors shall be referred to in connection with FIG. 1.

The oil is conducted through a conduit 10 to a first separator 12. In the separator 12 a first separation occurs of a first fraction of hydrocarbon gas which had been dissolved in the oil, while if necessary water is separated through a conduit 14. Thereafter the gas fraction is led into a compressor in a compressor plant as will be described below.

From the separator 12 the oil is led further through a conduit 16 via a reduction valve 15 to a second separator 18 where the pressure is one step lower, so that a second fraction of the dissolved gas is separated out from the oil. The second gas fraction is thereafter led to a compressor in a compressor plant, as will be explained below. The oil is led further through a conduit 20 via a reduction valve 17 into a third separator 22 where the pressure is lowered additionally, so that the oil is released of a third gas fraction. The oil, which is now freed of the bulk of the gas, is thereafter led through a conduit 24 to a storage supply for further handling or directly into a pipe conduit for transportation to a remotely disposed use location. It is normally desirable that the pressure of the oil in the third, that is to say the last separator 22, is as close to atmospheric pressure (stated as 1.0 bara) as possible so that as much as possible of the hydrocarbon gas which has been dissolved in the oil, becomes separated out before the oil is handled further.

The third hydrocarbon gas fraction which is separated out from the third separator 22, is led through a conduit 68 to a first of a row of compressors 26,28,30,32, which are arranged in series. In the compressors 26,28,30,32 the pressure of the gas is increased gradually up to a desired high pressure level, which can be just as high or higher than the pressure of the ingoing oil to the tank 12. In this case four compressors are shown, and the number of these will depend on the number of separators and the pressure which is employed in these plus the demand for pressure in the gas which is taken out from the last compressor.

It is an advantage that the hydrocarbon gas maintains a high pressure when for example it is led through a pipe conduit 33 in order to be reinjected into a reservoir or to be conducted from a plant at sea (not shown further) to a land installation.

The gas fractions which are separated out in the respective separators 12 and 18 at the high pressures, are led through respective conduits 19 and 21 into respective conduits between the compressors 30 and 32 and 28 and 30 respectively, in which the gas has an equivalent pressure.

Each separator 12,18,22 is connected via a conduit 34,36,38 to a common collection conduit 40. In these conduits 34,36,38 are coupled safety valves 42,44,46 which are included control systems and which can separately open and divert excess gases from the separators to the collection conduit 40. This can occur when the pressure in one or more of the separators becomes too high or other irregularities arise, as mentioned above. Each compressor 26–32 is connected to the collection conduit 40 via conduits 48,50,52,54, and in each of these are installed safety valves 56,58,60,62 which function analogously to the valves 42–46 connected to the separators. Besides a series of other elements (not shown further) in the process can also be connected to the collection conduit. In the known solutions the collection conduit 40 leads the gas forward to a flame tower where it is burned off. The gas pressure out to the torch is maintained somewhat above the atmospheric pressure, and as a rule a combustible gas (also called a scavenger gas) is supplied, and shown at 39, for maintaining a uniform gas flow.

The collection conduit 40 further comprises a liquid separator 64 for removing oil which has possibly condensed out as liquid from the gas.

It will be evident that in practice there are many sources from which gases are diverted to the collection conduit 40 during a malfunction. Furthermore it often happens that a safety valve which opens for diverting gases during a malfunction, does not close effectively when the defect is remedied, and the valve will then continue to leak gas to the collection conduit 40. This can last fully until a normal periodic maintenance is to be undertaken, for example over a time period of months or years.

According to the invention the excess gas is recirculated to the process by conducting it together with the separator gas which flows from the third separator 22 (or the last separator in the row of separators) to the first compressor 26 in the row of compressors.

Figure 2:
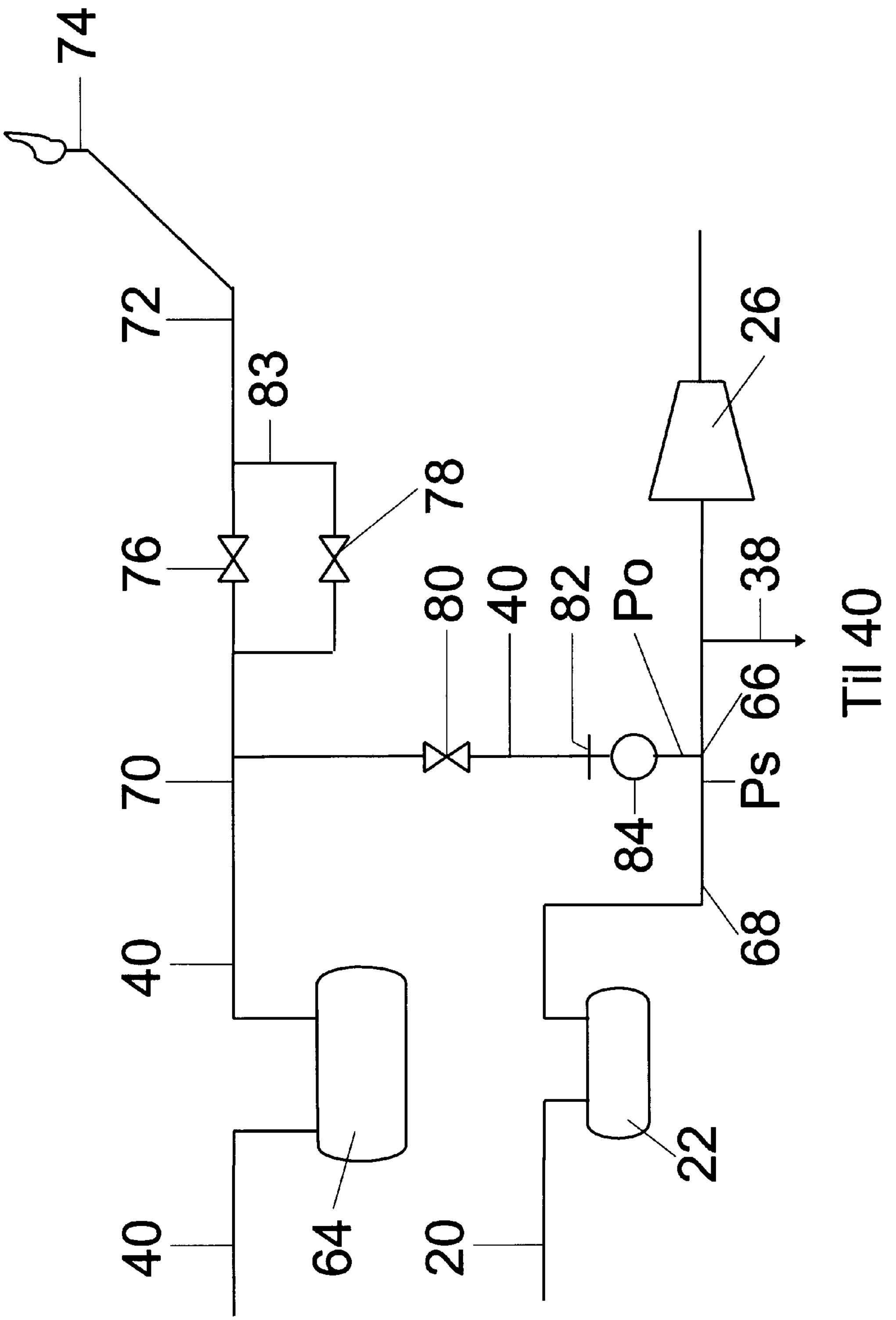
FIG. 2 shows a simplified flow sheet of the device according to the present invention.

As shown in FIG. 2, and indicated on FIG. 1, the collection conduit 40 is coupled to the conduit 68 between the separator 22 and the compressor 26 at a connection point 66.

Between the liquid separator 64 and the connection point 66 a branch conduit having a safety arrangement is connected to a branching point 70 on the conduit 40. In an emergency situation the safety arrangement can open for connection of the conduit and leading away of the excess gas. Such an emergency situation can arise for example on sudden increases in the gas pressure or on other irregularities occurring, during the conveying of the gas together with the separator gas.

The branch conduit 72 leads from the branching point 70 to a torch 74 of the type which is mentioned above. The safety arrangement of the branch conduit 72 comprises connected valves therein.

Figure 3A:
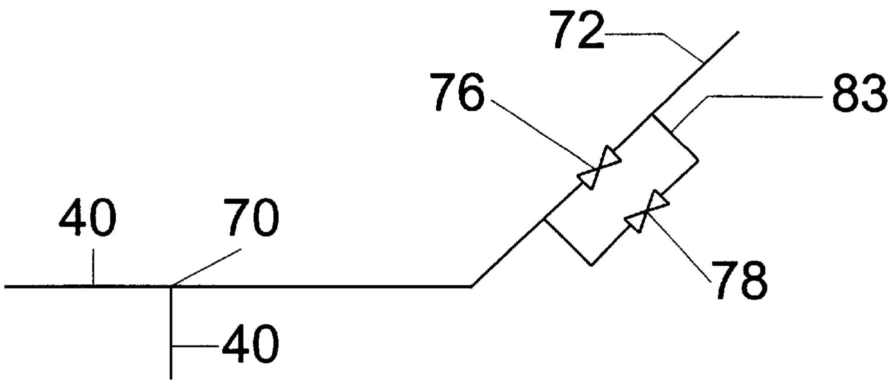
FIG. 3A shows a detail of a first construction of a safety arrangement according to the present invention illustrated in FIG. 2.

Valves of the safety arrangement are connected in the branch conduit 72 as follows:

Downstream of the branching point 70, a signal-controlled valve 76 is arranged in the branch conduit 72, and in a circulation pipe 83 around the signal-controlled valve 76 a safety valve 78 is connected. This construction is schematically illustrated in FIG. 3*a*.

Preferably the valve 76 is controlled (between an open and a closed position respectively) so that it is primarily closed, while secondarily it opens on a signal from registering measuring instruments, for example when it is registered that the excess gas maintains a pressure which exceeds a first set-pressure value. Furthermore when instruments register irregularities in the separators and the compressors the valve 76 shall open. In addition the valve is controlled by the closing down system of the plant.

The safety valve 78 is primarily closed, but secondarily will open automatically when the pressure upstream of the valve 78 exceeds a given second set-pressure value, and the valve is thereafter closed automatically when the pressure sinks to below the second set-pressure value. The valve means 76 and 78 are adjusted so that the second set-pressure value is higher than the first set-pressure value. The safety valve 78 will thereby open only in the few instances where the control system for the valve 76 fails so that this opens as required, and when the pressure of the excess gas exceeds the second set-pressure value.

Figure 3B:
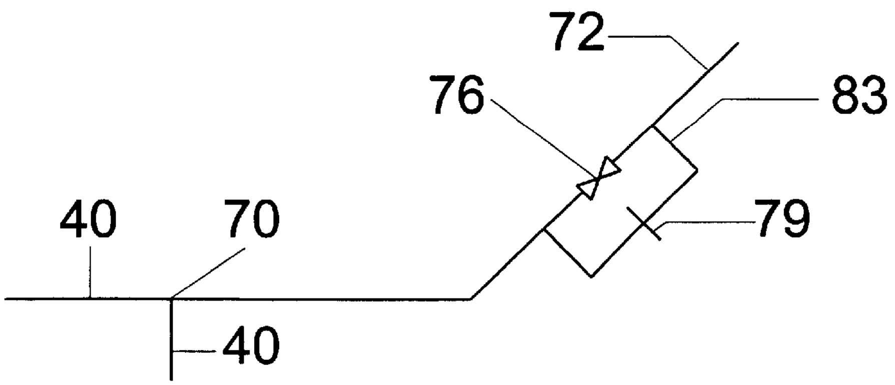
FIG. 3B shows a detail of a second construction of a safety arrangement according to the present invention illustrated in FIG. 2.

In a specific construction of the invention which is illustrated in FIG. 3*b*, the safety valve 78 in the circulation pipe 83 is replaced by a blow disc valve 79 of known type. The blow disc valve is blown automatically and produces a full gas flow through to the torch at a third set-pressure value. The blow disc valve 79 comprise a plate-shaped body, preferably of metal, and consists for example of a steel plate. The blow disc valve 79 is constructed so that it is blown at the third set-pressure value which is higher than the second set-pressure value. In a corresponding way, as for the safety valve 78, the blow disc valve 79 is only blown in that case where the signal-controlled valve 76 does not open on a signal from the pressure measuring instruments and the gas pressure exceeds the third set-pressure value.

The signal-controlled valve 76, the safety valve 78 and the blow disc valve 79 must besides be constructed and adjusted so that they, when they are activated, instantaneously produce a full opening for the gas flow through the branch conduit 72 to the torch 74.

As an illustrative example the first set-pressure value for the signal-controlled valve can be approximately 2 bara, and the second set-pressure value for the safety valve can be approximately 2.5 bara while the third set-pressure value whereby the blow disc valve 79 is blown, can be approximately 3.0 bara.

Figure 3C:
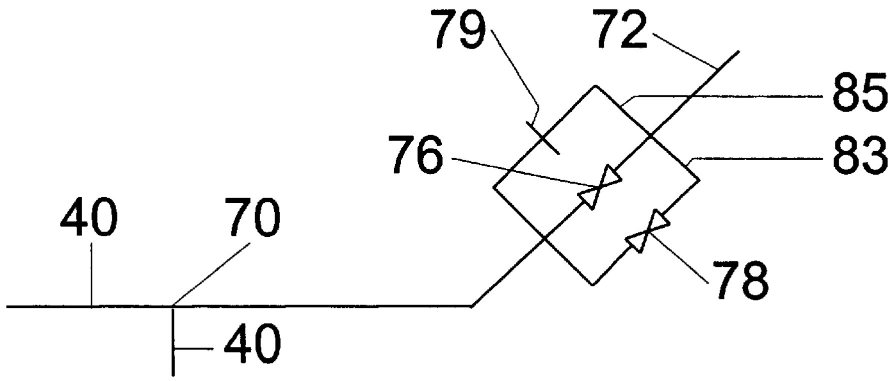
FIG. 3C shows a detail of a third construction of a safety arrangement according to the present invention illustrated in FIG. 2.

According to a second specific construction branch conduit 72 of the safety arrangement can comprise three types of valves, such as are illustrated in FIG. 3*c*. These types of valves can consist of a signal-controlled valve 76, a blow disc valve 79 and a safety valve 78. In this case the safety valve 76 is arranged in the main path of the branch pipe, while the two other valves are arranged in two separate circulation pipes 83 and 85 respectively around the blow disc valve 79. In this case the safety valve is so adapted, that it opens at a pressure which is lower than that pressure which the blow disc valve is activated at. When several parallel valves are arranged in this manner and one of these comprises a blow disc, the blow disc must in that case be the last link which is activated. This has its background in that when the blow disc valve is activated first, repairs must be postponed until a periodic maintenance, as is explained above.

In an alternative specific construction according to the invention the blow disc 79 is arranged in the main branch conduit 72 itself for the gas flow to the torch, while the signal-controlled valve is arranged in a circulation conduit around the blow disc.

The valve 76 is as mentioned controlled by the continuously registering measuring instruments, such as pressure measuring instruments, and these can for example be positioned in the branch conduit upstream of the valve 76 and in the collection conduit 40.

The flow of excess gas through the collection conduit 40 between the branching point 70 and the connection point 66 is controlled relative to the setting of the valve means 76,78 by coupling a signal-controlled valve 80 in the conduit 40. Furthermore there is coupled a back pressure valve 82 and a pressure increasing means 84, for example a compressor. The valve 80 is controlled so that it closes automatically when one of the valves 76,78 in the branch conduit 72 opens. The back pressure valve 82 shall functionally prevent gas from the main process unintentionally flowing into the collection conduit 40, if the gas should operate at too low a pressure. An example of such a situation is when the valve 76 towards the torch 74 opens or when the blow disc valve 78 is broken. A normally open emergency closing valve (not shown in the drawing) can also be coupled for employment for shutting off the conduit in an emergency situation.

The pressure increasing means 84 can be used to increase the pressure of the excess gas if its pressure is lower than the pressure of the gas flow from the separator 22.

As mentioned previously it is normally desirable that the third separator 22 in the row of separators is driven at a pressure as low down towards the pressure of the atmosphere (approximately 1 bara) as is operationally possible. The motive for this is that as much gas as possible shall be separated before the oil is diverted at 24. Normally the gas from the separator 22, that is to say the gas which flows into the conduit 68, has a pressure of the order of magnitude of approximately 1.5–2.0 bara. Beyond the conduit 68 the pressure of the gas drops as a consequence of valves and the like forwards towards the suction side in the first compressor 26 where the gas is expected to have its lowest pressure.

In a further specific construction according to the invention the connection point 66 is arranged in the conduit 68 in the said region, where the gas pressure is the lowest. This will reduce the need for the use of the pressure increasing means 84.

In the collection conduit 40 downstream of the liquid separator 64 the excess gas normally has a pressure in the region of from approximately 1.0 to 3–4 bara. Generally the pressure $P_o$ of the gas on the torch side must be higher than the pressure $P_s$ at the connection point 66 so that the excess gas shall be able to be conducted together with the gas from the separator and further into the compressors 26–32. However if the pressure on the torch side is lower than the pressure at the connection point 66, either the pressure increasing means (the compressor) 84 must be used in order to increase the pressure $P_o$ of the excess gas, or so must the regulation system open the valve 76 at the same time as the signal-controlled valve 80 closes, so that the burning off of gas in the torch 74 starts. The lighting of torch 74 can besides be automatically controlled depending upon the position of the valve means 76,78, possibly also in that pressure-sensitive instruments, which are positioned upstream of the valve means 76,78 in the conduit 72, register that gas flows past the valve means 76,78.

In the present specification and in the accompanying drawings the invention is shown in connection with a plant where there is installed only one collection conduit system. However the present invention can also be used in the cases where two systems are employed in parallel, for example in the form of a high pressure and a low pressure collection conduit system. A high pressure collection conduit system is normally driven by a pressure of the order of magnitude of 3–5 bara, while a low pressure-torch system is driven by approximately 1.5 bara.

When the plant comprises two collection conduit systems the gas from the two systems can be conducted together upstream of the connection point 66, that is to say before the inlet to the compressor 26. As an alternative to conducting the gas back to the process, such as for reinjection or bringing on land via pipe lines the gas can also be used for the production of energy or for the operation of steam boilers and the like at the oil production plant itself.

The device according to the invention can, as mentioned, be installed with advantage in an existing oil/gas production plant where a collection conduit system is already present which leads excess gases to a torch. Such collection conduit systems are besides dimensioned so that the whole gas production can be burned off in the torch in an emergency situation. In such a case the collection conduit 40 upstream of the point 70 plus the torch pipe 72, will therefore be dimensionally defined as the main conduit of the system, while the collection conduit 40 between the points 70 and 66 can be considered as a branch conduit. This branch conduit, which shall catch and lead smaller quantities of excess gases between the points 70 and 66, can therefore have smaller dimensions than the afore-mentioned main conduit.

By the present invention a novel solution is provided for the recovery of excess or torch gas in that it is conducted back to the main process, that is to say that the excess gas is conducted together with the process gas itself. Furthermore the solution gives a high degree of safety, since the excess gas will always be able to be conducted away for burning off in a connected torch system, if malfunctions in the control system should arise.

Consequently by the present invention the extent of torch operation on oil installations can be reduced to only apply to the instances where abnormal situations arise in the plant. Moreover the blow disc valve used in the safety arrangement will imply that the torch system will always function with unintentional pressure build ups of the gases in the plant even if the built-in safety systems should fail.

Even if the invention is particularly directed to function in connection with the collection conduit system in an oil separation plant at sea, it is clear that it can also be used in general in connection with other types of process plant where combustible gases are developed which are led via collection conduit systems for recovery.

What is claimed is:

1. A safety device in an oil/gas treatment plant where excess gas is intercepted from a number of sources and led through a collection conduit for advancing for recovery, the collection conduit downstream of the sources includes a branching point having a branch conduit leading to a torch, the safety device comprising:

a normally closed first valve in the branch conduit, the first valve being controlled by a signal from a continuously registering pressure-measuring instrument positioned in the collection and branch conduits upstream of the first valve;

a normally closed second valve in a circulation conduit connected to the branch conduit on both sides of the first valve; and a normally opened third valve in the collection conduit downstream of the branching point, the third valve being closed when at least one of the first and second valves is open;

wherein the safety device normally closes off the branch conduit, but secondarily opens the branch conduit for diverting the excess gas to the torch when the pressure of the excess gas exceeds a given value and/or when a malfunction occurs in the plant.

2. The safety device in accordance with claim 1, wherein the first valve opens at a gas pressure above a first set value, while the second valve opens at a gas pressure above a second set value, and the second set value is higher than the first set value.

3. The safety device in accordance with claim 2, wherein the second valve includes a blow disc valve which opens at a gas pressure which exceeds a third set value, and that the third set value is higher than the second set value.

4. A safety device in an oil/gas treatment plant where excess gas is intercepted from a number of sources and led through a collection conduit for advancing for recovery, the collection conduit downstream of the sources includes a branching point having a branch conduit in which the safety device and a torch are coupled, the safety device comprising:

a blow disc valve in the branch conduit; and a signal-controlled valve in a first circulation conduit connected to the branch conduit on both sides of the blow disc valve;

wherein the safety device normally closes off the branch conduit, but secondarily opens the branch conduit for diverting the excess gas to the torch when the pressure of the excess gas exceeds a given value and/or a malfunction occurs in the plant.

5. The safety device in accordance with claim 4, further comprising:

a safety valve in a second circulation conduit connected to the branch conduit on both sides of the blow disc valve.

6. A safety device in an oil/gas treatment plant where excess gas is collected in a collection conduit from a number of oil/hydrocarbon gases separators and from a series of hydrocarbon gases compressors, a connection conduit connects the separator operating at the lowest pressure with the compressor providing the first stage of compression, the collection conduit downstream of the separators and compressors includes a branching point having a branch conduit including a plurality of parallel pathways leading to a torch, the safety device comprising:

a normally closed first valve in a first one of the branch conduit pathways, the first valve being controlled by a signal from a continuously registering pressure-measuring instrument positioned in the collection and branch conduits upstream of the first valve; and a normally closed second valve in a second one of the branch conduit pathways;

wherein the safety device normally closes off the branch conduit, but secondarily opens the branch conduit for diverting the excess gas to the torch when the pressure of the excess gas exceeds a given value and/or a malfunction occurs in the plant.

7. The safety device in accordance with claim 6, further comprising:

a third valve in the collection conduit for closing when the pressure $P_s$ of the excess gas in the connection conduit exceeds the pressure $P_o$ of the excess gas in the collection conduit, whereby one of the first and second valves in the branch conduit opens for the excess gas to flow to the torch; and a pressure-increaser coupled downstream of the third valve for increasing the pressure $P_o$ of the excess gas in the collection conduit to above the pressure $P_s$ of the excess gas in the connection conduit.

8. The safety device in accordance with claim 6, further comprising:

an emergency closing valve coupled between the third valve and the pressure-increaser.

* * * * *